United States Patent
Weaver et al.

(10) Patent No.: US 12,516,171 B2
(45) Date of Patent: Jan. 6, 2026

(54) SYNTACTIC FOAMS, METHODS OF PRODUCING SYNTACTIC FOAMS, AND PRODUCTS INCLUDING SYNTACTIC FOAMS

(71) Applicant: Aqua Satellite, Inc., Menlo Park, CA (US)

(72) Inventors: Matthew Devore Weaver, Aptos, CA (US); Michael Montoya, Menlo Park, CA (US)

(73) Assignee: Aqua Satellite, Inc., Menlo Park, CA (US)

( * ) Notice: Subject to any disclaimer, the term of this patent is extended or adjusted under 35 U.S.C. 154(b) by 570 days.

(21) Appl. No.: 17/988,943

(22) Filed: Nov. 17, 2022

(65) Prior Publication Data

US 2023/0159721 A1     May 25, 2023

Related U.S. Application Data (60) Provisional application No. 63/282,003, filed on Nov. 22, 2021.

(51) Int. Cl.
| | | |
|---|---|---|
| *C08J 9/228* | (2006.01) | |
| *C08J 9/232* | (2006.01) | |
| *C08J 9/236* | (2006.01) | |

(52) U.S. Cl.
CPC ........... *C08J 9/228* (2013.01); *C08J 2203/22* (2013.01); *C08J 2347/00* (2013.01)

(58) Field of Classification Search
CPC .... C08J 9/228; C08J 2203/22; C08J 2347/00; C08J 9/32; B29K 2105/0076; B29K 2105/04; B29K 2201/002; B29K 2201/003; B29C 67/20; C08K 7/20; C08L 9/00

See application file for complete search history.

(56) References Cited

U.S. PATENT DOCUMENTS 4,107,134 A * 8/1978 Dawans ................... C08K 7/20
524/496

FOREIGN PATENT DOCUMENTS

| GB | 2516047 A * | 1/2015 | ............ C08J 9/0028 |
| WO | WO-2017199102 A2 * | 11/2017 | ............... F16L 1/163 |

OTHER PUBLICATIONS

Data sheet for 3M S38XHS Glass Bubbles. 3M. 2025. (Year: 2025).*

* cited by examiner

*Primary Examiner* — K. Boyle
(74) *Attorney, Agent, or Firm* — Kilpatrick Townsend & Stockton LLP (57) ABSTRACT

A method for producing a syntactic foam for high-pressure environments includes providing a housing having a void volume. The housing may include an inlet and an outlet to the void volume of the housing. The method includes injecting a plurality of microspheres comprising glass into the housing. The plurality of microspheres include a first set of microspheres comprising an average diameter ranging from 5 microns to 150 microns. The method includes agitating the housing to settle the plurality of microspheres within the housing. The method includes injecting a resin from the inlet of the housing to the outlet of the housing to fill voids between the plurality of microspheres to form a resin-microsphere matrix. The resin may have a viscosity less than 100 centipoise. The method may include curing the resin-microsphere matrix in the housing to produce a cured composition.

15 Claims, 5 Drawing Sheets

SYNTACTIC FOAMS, METHODS OF PRODUCING SYNTACTIC FOAMS, AND PRODUCTS INCLUDING SYNTACTIC FOAMS

CROSS-REFERENCE TO RELATED APPLICATION

This application claims the benefit of priority to U.S. Provisional Application No. 63/282,003, filed Nov. 22, 2021, the disclosure of which is hereby incorporated by reference it its entirety.

BACKGROUND OF THE INVENTION

Deep-water exploration involves sending a vehicle to great depths with electronics suitable for imaging or otherwise detecting features in the vicinity of the vehicle. The pressure at the bottom of the ocean can be as high as 15,750 pounds per square inch (psi). As a result of the engineering challenges associated with designing vehicles for this type of environment, deep bodies of water like the ocean remain largely unexplored. For example, the weight of the onboard components of underwater vehicles and the buoyancy requirements in deep bodies of water need to be balanced for efficient travel. However, the extreme pressure in deep bodies of water may compress buoyant components in the vehicle such that they have higher packed densities than their original state, which may further alter the balance of weight and buoyancy for underwater vehicles.

Despite the progress made in the area of ocean exploration, methods and systems are needed for maintaining the buoyancy of underwater vehicles for efficient travel.

SUMMARY OF THE INVENTION

This disclosure presents a novel approach for producing syntactic foams. In particular, the disclosure describes a number of embodiments related to producing syntactic foams that provide buoyancy in high-pressure environments. The syntactic foams described herein may be used as an external shell for an underwater vehicle or can be provided in an interior volume of an underwater vehicle in order to provide a requisite amount of buoyancy. For example, the syntactic foam can be used as an external shell (e.g., hull) of an underwater vehicle. In some embodiments, the syntactic foams described herein substantially maintain their buoyancy in high-pressure environments even at high compressive forces. Although some of the embodiments discussed herein are related to methods and system for producing syntactic foams for deep-water applications, it is to be understood that the approaches described here may be employed in any suitable application where high pressures and/or buoyancy are involved.

In some embodiments, the present disclosure provides a method of producing a syntactic foam. The method may include providing a housing including a void volume. The housing includes an inlet and an outlet to the void volume. The method also includes injecting a plurality of microspheres comprising glass into the void volume of the housing. The plurality of microspheres may include a first set of microspheres comprising an average diameter ranging from 5 microns to 150 microns. The method also includes agitating the housing to settle the plurality of microspheres within the housing. The method also includes injecting a resin from the inlet of the housing to the outlet of the housing to fill voids between the plurality of microspheres to produce a resin-microsphere matrix. The resin may comprise a viscosity less than 100 centipoise.

In some embodiments, the present disclosure is related to a novel syntactic foam. The syntactic foam includes a plurality of microspheres comprising glass and a dried resin. A portion of the plurality of microspheres may have an average diameter ranging from 5 microns to 150 microns. The syntactic foam may include a dried resin comprising a density ranging from 0.99 $g/cm^3$ to 1.05 $g/cm^3$. In some embodiments, the dried resin may comprise a density ranging from 1.00 $g/cm^3$ to 1.03 $g/cm^3$. In some embodiments, the dried resin comprises a dicyclopentadiene-based resin. In some embodiments, the dried resin comprises a metallic catalyst. In some embodiments, a vehicle may comprise an outer shell comprising the syntactic foam described herein.

Numerous benefits are achieved by way of the present disclosure over conventional syntactic foams. For example, embodiments of the present disclosure provide syntactic foams that can reduce the overall foam volume in an underwater vehicle utilized for buoyancy. The syntactic foams described herein enable underwater vehicles with substantially lower total volume, high solid/utilized volume, and smaller batteries for identical payload and speed/range capability, whereas conventional underwater vehicles require a larger buoyancy volume, which can dominate the overall volume of the underwater vehicle. As explained in the disclosure, the syntactic foam may include a plurality of glass microspheres having a specific size that are fixed in a resin having a very low viscosity to produce a syntactic foam for deep-water applications. The syntactic foams described herein may be used in a number of deep-water applications such as deep-water exploration. These and other embodiments of the disclosure, along with many of their advantages and features, are described in more detail in conjunction with the text below and attached figures.

DETAILED DESCRIPTION OF SPECIFIC EMBODIMENTS

The present disclosure describes a number of embodiments related to syntactic foams and methods of producing syntactic foams. The syntactic foams described herein can be used in underwater vehicles in high-pressure environments in order to provide buoyancy. Such high-pressure environments may include deep-water environments such as regions near the ocean floor, where extremely high pressures may be experienced (e.g., 15,750 pounds per square inch (psi), or about 108,592 kilopascals). In high-pressure environments (e.g., environments associated with deep-water applications), underwater vehicles experience tremendous compressive forces that affect the buoyancy of the vehicle. For example, the compressive forces acting on underwater vehicles including a buoyant element, such as a foam, may compress the buoyant element, thereby making the overall vehicle more dense. As a result, the underwater vehicle may no longer have a neutral or positive buoyancy in high-pressure environments, thus reducing the efficiency of the vehicle. The syntactic foams described herein may be used to maintain buoyancy of an underwater vehicle at high pressures (e.g., near the ocean floor).

Conventional underwater vehicles include components (e.g., electronics suitable for imaging or otherwise detecting features) that have a greater density than water. For example, a lithium-ion battery has more than two times the density of water, which would cause the lithium ion battery to sink in water by itself. Therefore, a buoyancy element (e.g., low-density element) may be added to the underwater vehicle to achieve a neutral or positive buoyancy. Neutral buoyancy is a desired property for an underwater vehicle as it enables the vehicle to achieve a suspended state in water with net zero forces acting on the vehicle.

For underwater vehicles, the vessel or hull displaces fluid to achieve buoyancy. One type of vessel is a pressure vessel. The pressure vessel can have a spherical or cylindrical geometry. Conventionally, various organic compounds and fluids can be added to a pressure vessel for buoyancy. Organic compounds and fluids are solid materials that are less dense than water (although only marginally buoyant). Lower density materials tend to be more compressible and/or have a lower bulk modulus. As such, under extreme pressures, the volume of organic compounds and fluids may significantly decrease while their density rises. This results in a system that may be neutrally buoyant at one depth but negatively buoyant at a greater depth. In some cases, closed-cell porous foam materials are used as buoyancy elements at low pressures, but also suffer from dramatic volume and shape changes at extreme pressures. Porous materials capable of much higher pressures and bulk modulus are largely syntactic foams consisting of micro spherical hollow elements (typically glass or ceramic) embedded in a resin matrix.

For underwater vessels, the amount of material necessary for the walls of the vessel to withstand pressure generally increases proportionally with pressure. This ratio of displaced volume/wall material mass is constant regardless of vessel size (e.g., 4 small vessels or 1 large vessel of the same material and geometry will provide the same displacement per mass). With increasing pressure, the mass of the wall material necessary to support the inherent wall stresses may ultimately exceed the mass of the water volume displaced by the vessel. A contained empty volume may be achieved, but the vessel itself will have no utility for increasing buoyancy. In terms of buoyant vessel performance, steel and aluminum have the lowest buoyancy, titanium and wound carbon fiber have better buoyancy than steel and aluminum, glass (e.g., Pyrex) has better buoyancy than titanium and wound carbon fiber, and ceramics (e.g., alumina) has the best buoyancy performance of this group.

To provide a given amount of buoyant force, the necessary amount of volume (and dry mass) of that buoyant object increases as the density of a buoyant object approaches that of the fluid it displaces. For example, if a buoyant object is half the density of water, then for 1 kg of desired displacement mass (e.g., 0.67 liters of a lithium-ion battery, totaling 1.67 kg battery mass) roughly two liters (e.g., 1 kg) of the buoyant object will be utilized. If the buoyant object is 90% of the density of water, then for 1 kg of displacement mass, 10 liters (and 9 kg worth) of displacement object is utilized. The buoyancy element of a high-pressure underwater vehicle can quickly represent a majority of the dry mass and material of the underwater vehicle (e.g., 9 kg of syntactic foam for 1.67 kg of battery).

Various organic fluids may be buoyant in water and capable of being subject to repeated extreme pressures. However, their typical low bulk moduli and associated extreme density change preclude practical use, short of introducing irreversible mass shedding (e.g., irreversibly dumping anchor weight material during descent) in order to maintain near neutral buoyancy. Thus, in order to meet sustainable, contained, repeated-depth-cycle applications, embodiments of the present invention utilize pressure vessels incorporating novel syntactic foams.

In order to address the extreme pressures present in the depths of the earth's oceans, embodiments of the present invention utilize syntactic foams made of microspheres of glass or ceramic in order to implement suitable buoyancy elements that are capable of achieving contained, repeated depth-cycles. Conventional syntactic foams are produced from slurries that have sub-optimal packing properties, thereby resulting in density gradients and voids. Additionally, conventional syntactic foams utilize high-density resins leading to excessive water absorption and poor performance at extreme pressures.

Embodiments of the present invention provide methods for producing syntactic foams that are effective to provide buoyancy in deep-water applications, in which existing syntactic foams approach their limits of utility due to densities approaching that of water or of compromised compositions known to progressively degrade with time and pressure cycles. The syntactic foam described herein achieves substantially superior microsphere packing densities in arbitrary shapes (e.g., molded shapes) while preventing material waste, for example, using non-subtractive processes. Thus, the syntactic foams described herein may be used to maintain buoyancy of an underwater vehicle at high pressures (e.g., near the ocean floor).

In some embodiments, the syntactic foams described herein are capable of withstanding extreme pressures at ocean depths while providing favorable net buoyancy. In some embodiments, the methods described herein produce a syntactic foam that can be used to form the hull of an underwater vehicle. The syntactic foams descried herein have a high packing density of microspheres in a low-viscosity resin for full ocean depth applications. The syntactic foam can be utilized for at least two purposes: forming a hydrodynamic body of an underwater vehicle and providing buoyancy. The methods described herein produce a syntactic foam that can have an arbitrary shape, characterized by robustness, and achieve net lower system costs. All of these attributes of the syntactic foam provide a smaller, more efficient craft for a given payload.

Figure 1:
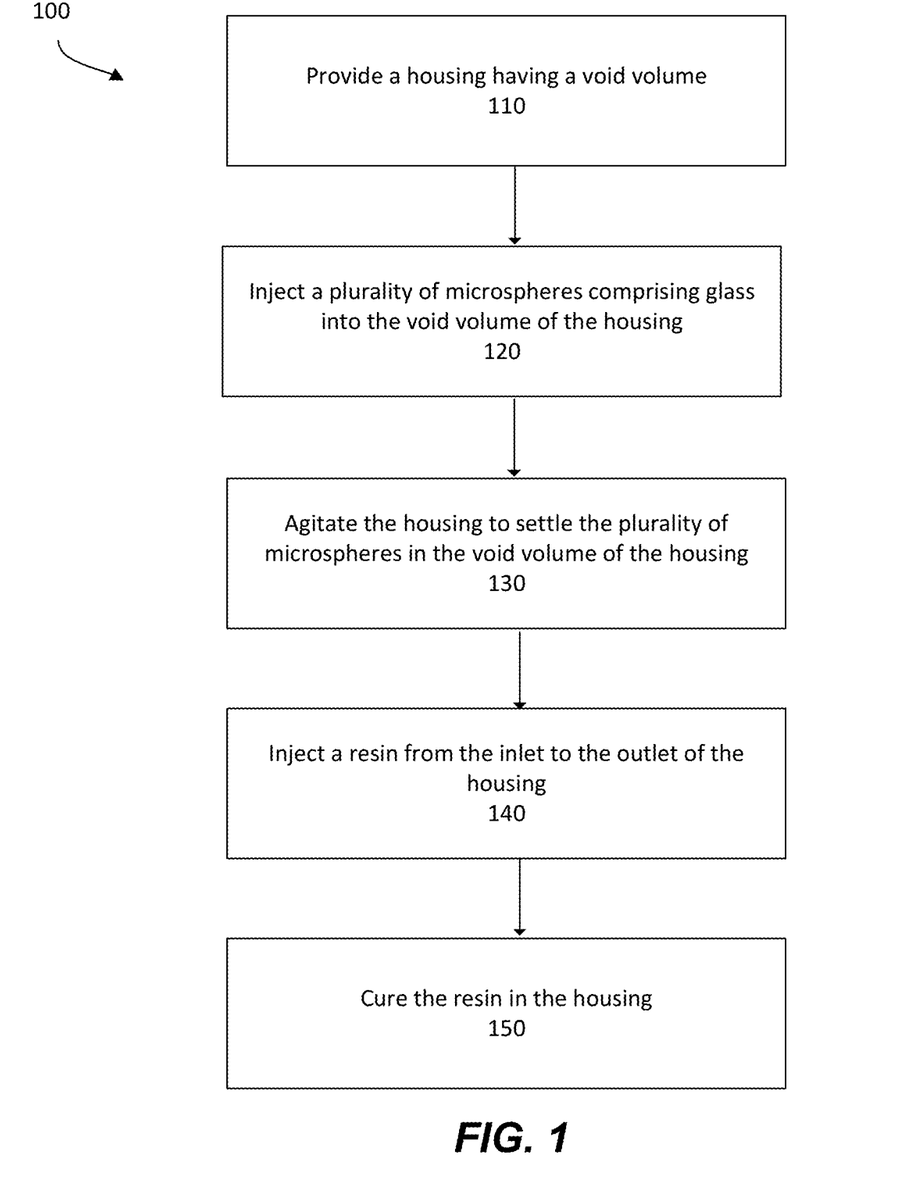
FIG. 1 shows a flow diagram of a method of producing a syntactic foam according to embodiments of the present invention.

FIG. 1 illustrates a method (100) for producing a syntactic foam according to some embodiments of the present invention. The method may include providing a housing have a void volume (110). The housing may include an inlet and an outlet. In some embodiments, the housing may be a mold. The mold may include a void volume for receiving a volume of material (e.g., microspheres and resin). In some embodiments, the void volume may have a geometry (e.g., three-dimensional geometry) that is desired for a molded article. For example, the void volume may comprise a spherical, conical, cylindrical, or other suitable geometry. In some embodiments, the void volume may be shaped to correspond to a portion of the outer shell of an underwater vehicle. For example, the void volume may have a complex geometry.

The method (100) may include injecting a plurality of microspheres into the void volume of the housing (120). The plurality of microspheres comprising glass can also be referred to as a plurality of glass microspheres. The plurality of microspheres may comprise a first set of microspheres comprising an average diameter ranging from 5 microns to 150 microns. In some embodiments, the plurality of microspheres comprises a plurality of sets of microspheres. Each of the plurality of sets of microspheres can be sequentially added to the housing. For example, the plurality of microspheres may comprise injecting a first set of microspheres, followed by injecting a second set of microspheres, followed by injecting a third set of microspheres, and so on.

Each of the plurality of sets of microspheres may comprise an average diameter from 5 microns to 200 microns. In some embodiments, the microspheres comprise an average diameter from 5 microns to 200 microns, e.g., 10 microns to 190 microns, 20 microns to 180 microns, 30 microns to 170 microns, 40 microns to 160 microns, 50 microns to 150 microns, 60 microns to 140 microns, 65 microns to 130 microns, 70 microns to 125 microns, or 50 microns to 100 microns. In some embodiments, a first set of microspheres has an average diameter different than a second set of microspheres. For example, the first set of microspheres may have larger diameter than a second set of microspheres such that the second set of microspheres fill any void volume present between the first set of microspheres. In some embodiments, the microspheres are manufactured by 3M™. For example, the microspheres can be 3M™ Glass Bubbles.

In some embodiments, the microspheres are natively rated for full ocean depth isostatic pressures. The microspheres may have a volumetric density ranging from 0.25 g/cm$^3$ to 0.60 g/cm$^3$, e.g., 0.30 g/cm$^3$ to 0.55 g/cm$^3$, 0.35 g/cm$^3$ to 0.55 g/cm$^3$, 0.40 g/cm$^3$ to 0.55 g/cm$^3$, 0.40 g/cm$^3$ to 0.50 g/cm$^3$, or 0.45 g/cm$^3$ to 0.50 g/cm$^3$. The microspheres can be high-strength, low-density hollow glass microspheres. The microspheres may be insoluble in water and have low thermal conductivity, thus making these density-reducing additives excellent for use in deep water applications. In some embodiments, the microspheres can be surface treated to enhance bonding with a resin and minimize water pickup of a foam at high pressures.

In some embodiments, the method includes applying a vacuum to the housing to remove any air from the interior volume of the housing. In some embodiments, the vacuum is applied to the housing prior to injecting the housing with microspheres. Any air or gases in the housing can be evacuated from the housing prior to injecting the housing with microspheres.

The method may include agitating the housing to settle the plurality of microspheres within the void volume of the housing (130). In some embodiments, agitating the housing includes applying an external force to the housing to settle the microspheres in the housing. The external force can be any mechanical means (e.g., vibrational force). For example, the housing can be agitated by vibration, sonication, or ultrasound. By agitating the housing, the microspheres settle at the base of the housing (e.g., on a filter or blind). Due to their size and density, the microspheres can settle in the housing at their optimal packing density. In some embodiments, the housing can be agitated each time a set of microspheres is injected into the housing. In some embodiments, the method may include applying a gas flow through the housing to settle the plurality of microspheres. The gas flow can be applied concurrently while agitating the housing to settle the plurality of microspheres. The direction of the gas flow may be parallel to gravitational force.

In some embodiments, the housing can be agitated in a rotational system to settle the plurality of microspheres in the housing in their most closely packed configuration. In some embodiments, the rotational system oscillates the housing around a rotational axis to settle the plurality of microspheres. For example, the rotational system oscillates the housing in a rotational manner (e.g., a twisting motion) about the vertical axis of the housing. In some embodiments, the housing can be rotated clockwise and counterclockwise, alternatively, at an oscillating frequency. For example, the housing can be rotated clockwise and counterclockwise about once per second and continued for a plurality of oscillations. In some embodiments, the oscillation frequency can vary between each of the oscillations of the plurality of oscillations.

In some embodiments, the rotational system may comprise a platform. In some embodiments, the platform may be a single-rotational-axis platform. For example, the platform can be a rotary low-friction bearing platform. The platform may include a torsional spring to provide a natural underdamped oscillation frequency. In some embodiments, the platform may include a stiff torsional spring to provide higher oscillation frequencies. The rotational system may include a rotational actuator that provides a natural frequency with alternating small-angle rotations (e.g., clockwise and then counterclockwise and repeat). In some embodiments, the housing may be vertically oriented on a rotary low-friction bearing platform. The housing may have a characteristic rotational inertia about the rotational axis of the platform. In some embodiments, the rotational axis of the platform may correspond to the axisymmetric center of the housing.

The rotational system can provide oscillating rotations such that the plurality of microspheres experience maximum shear at the outermost radial position of the housing resulting in shear dislocation planes that aid the plurality of microspheres in efficiently relocating and settling into their tightest configuration. Once the portion of the plurality of microspheres at the outermost radial position of the housing are in their tightest conformation, the probability of shear movement and flow is decreased, and shear forces act on other portions of the plurality of microspheres closer to the inner diameter of the housing. As settling of the plurality of microspheres occurs from the outer diameter to the inner diameter of the housing, the sheer forces will translate more efficiently to microspheres closer to the central axis of the housing, thereby increasing shear dislocations for the microspheres closer to the central axis of the housing. In some embodiments, additional microspheres can be fed to the housing (e.g., by gravity or driven by gas flow) to fill up the volume offset by settling the microspheres.

In some embodiments, the rotational shear provided by the rotational system efficiently and evenly applies settling power flux over the entire housing, and develops shearing forces that are more efficient at relocating microspheres. This results in better compaction of the plurality of microspheres in a shorter timeframe. In some embodiments, the rotational shear provided by the rotational system is advantageous for elements having a circular cross section or an axisymmetric cross-section. For example, the rotational system can tightly pack microspheres for axisymmetric submarine bodies, cylinders, hexagonal, or near-cylindrical elements.

In some embodiments, injecting the plurality of microspheres includes progressively injecting a plurality of sets of microspheres into the housing and agitating the housing. For example, each set of microspheres can be loaded into a housing (e.g., a mold cavity) one after the other. In some embodiments, the housing can be agitated each time a set of microspheres of the plurality of sets of microspheres is injected into the housing. For example, a first set of microspheres can be injected into the housing and the housing can be agitated for the first time. Then a second set of microspheres can be injected into the housing and the housing can be agitated for the second time.

The method may include injecting a resin from the inlet of the housing to the outlet of the housing to fill voids between the plurality of microspheres (140). After each of the plurality of microspheres are loaded into the housing and the housing is agitated to settle the microspheres, a resin can be injected into the housing. In some embodiments, a resin can be injected into the housing after each of the plurality of sets of microspheres are loaded into the housing. The resin may be injected from the bottom of the housing to the top of the housing. For example, the resin can be injected at the bottom of housing to achieve a uniform flow front through the housing.

In some embodiments, the resin may comprise a norborene-based resin. In some embodiments, the resin comprises a dicyclopentadiene-based resin. The resin may further include one or more metallic catalysts. The resin may comprise a viscosity less than 100 centipoise, e.g., less than 80 centipoise, less than 60 centipoise, less than 50 centipoise, less than 40 centipoise, or less than 20 centipoise. In some embodiments, the resin comprises a viscosity less than 20 centipoise. In some embodiments, the resin (e.g., dicyclopentadiene-based resin) has a viscosity that is ten times lower than conventional resins (e.g., epoxy, polyester, vinylester). This advantageously provides low resin-matrix densities. The density difference of the syntactic foams described herein provides buoyancy properties that are not achieved by conventional syntactic foams. In some embodiments, the resin is a hydrophobic resin having very low water absorption. For example, the resin may have a water absorption less than 1%.

The plurality of glass microspheres may comprise a hollow internal structural. In some embodiments, the hollow internal structure of the glass microspheres can serve as dry cavity space. The microspheres comprise a specific size and density to achieve a random close-packed, max sphere count/lowest density, with little or no mobility. For example, the microspheres are effectively interlocked in position. In some embodiments, the microsphere volume fraction in the housing can be improved by discrete sizing of microspheres to achieve an aggregate of larger microspheres with smaller microspheres packed in the void volumes between the large microspheres. The novel dry packing process described herein achieves a maximum, random close-packed microsphere volume fraction.

In some embodiments, the method may include curing the resin in the housing to produce a cured composition (150). For example, after the plurality of microspheres and the resin are injected into the housing, heat may be applied to the housing to cure the resin in the housing. The resin may be heated to a temperature range from 50° C. to 250° C., e.g., from 60° C. to 240° C. from 75° C. to 225° C., from 80° C. to 200° C., from 100° C. to 190° C., from 120° C. to 180° C., from 125° C. to 175° C., from 130° C. to 170° C., or from 140° C. to 160° C. The resin can be heated for a time sufficient to cure the resin. For example, the housing can be heated to a temperature of 140° C. for 10 minutes, or 100° C. for 1 hour, or 80° C. for 2 hours. In some embodiments, cooling elements can be supplied to a portion of the housing. The cooling elements can maintain a temperature on one side of the housing (e.g., mold) to achieve a temperature differential in the housing. In some embodiments, the method may include crushing the cured composition in the housing. The cured composition can be crushed in the mold using high-pressure gas or a mechanical means.

Advantageously, the resin composition has a density at or close to the density of water after curing. The resin composition can be cured to polymerize the resin from a liquid form to a solid form. In some embodiments, the density of the cured resin ranges from 0.90 $g/cm^3$ to 1.15 $g/cm^3$, e.g. from 0.95 $g/cm^3$ to 1.10 $g/cm^3$, from 0.96 $g/cm^3$ to 1.08 $g/cm^3$, from 0.97 $g/cm^3$ to 1.06 $g/cm^3$, from 0.99 $g/cm^3$ to 1.05 $g/cm^3$, or from 0.99 $g/cm^3$ to 1.04 $g/cm^3$. In some embodiments, the density of the cured resin ranges from 0.99 $g/cm^3$ to 1.05 $g/cm^3$. The density of the cured resin in combination with the plurality of microspheres can provide a neutral or positive buoyancy to an underwater vehicle.

Figure 2A:
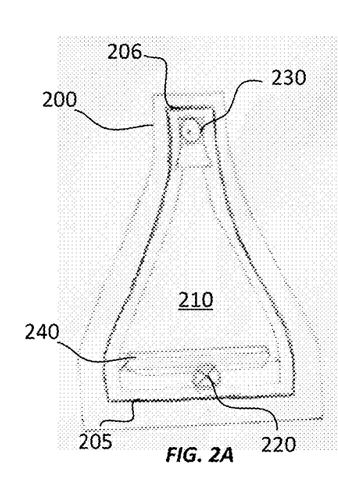
FIGS. 2A-C show an illustration of evacuating atmosphere from a housing, a corresponding cross-sectional view of a front face of the housing, and a corresponding cross-sectional view of the housing at a 90° angle, respectively, according to some embodiments.
Figure 2B:
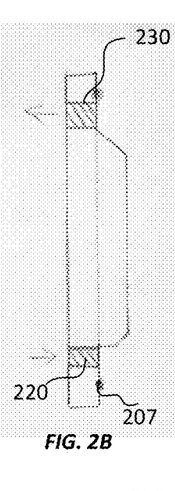
Figures 2C, 3A:
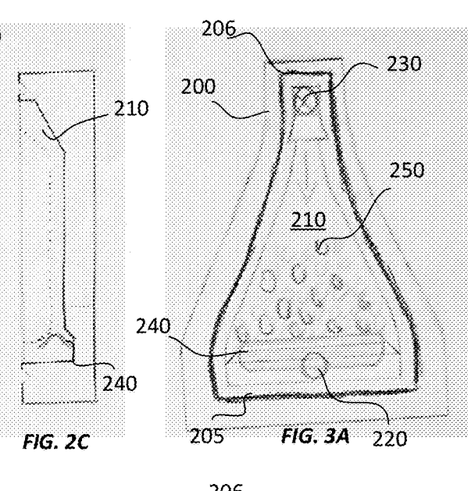
FIGS. 3A-C show an illustration of filling a housing with microspheres, a corresponding cross-sectional view of a front face of the housing, and a corresponding cross-sectional view of the housing at a 90° angle, respectively, according to some embodiments.

FIGS. 2A-2C show an illustration of evacuating atmosphere from a housing, a corresponding cross-sectional view of a front face of the housing, and a corresponding cross-sectional view of the housing at a 90° angle, respectively, according to some embodiments. In some embodiments, the housing 200 may be a mold comprising a void volume 210. The void volume 210 may be an interior region of the housing 200 having a volume. The void volume 210 can have a desired shape to form parts of particular geometries. For example, the void volume 210 may correspond to a geometry of a hull of an underwater vehicle. As described herein, components (e.g., microspheres and a resin) may be injected into the void volume 210 of the housing 200 to produce a part having the geometry of the void volume 210.

FIG. 2B shows a cross-sectional view of a flow path through the housing 200. In some embodiments, a vacuum is applied to the housing 200 to evacuate any air or gas from the interior volume of the housing. The flow path of any evacuated air or gas may begin at a base portion 205 of the housing 200 and flow upward to a top portion 206 of the housing 200 and through the outlet 230. Any air or gases in the housing 200 can be evacuated from the housing 200 to provide higher packing densities in the void volume 210. FIG. 2C shows a cross-sectional view of a 90° angle of the housing 200 shown in FIG. 2A. The housing 200 may include a blind 240 at a base portion 205 of the housing. In some embodiments, the blind 240 can be a screen or porous material that allows resin to flow through, but prevents any microspheres from flowing through the blind 240. In some embodiments, the housing 200 may include one or more O-rings 207 to seal the housing before filling the void volume 210 with components.

The housing 200 may include an inlet 220 and an outlet 230 that provides a flow path for fluids (e.g., air or resin). The inlet 220 is designed to provide a laminar flow front when a fluid (e.g., a resin) moves from the inlet 220 to the outlet 230. For example, the housing 200 can connect an open channel to the inlet 220. The open channel can have a larger volume that the inlet 220. The open channel can have the largest cross-section adjacent the inlet. The fan-gate design of the open channel allows a fluid to decrease in velocity towards the inlet 220, but increase lateral velocity to provide a uniform flow front.

Figure 3B:
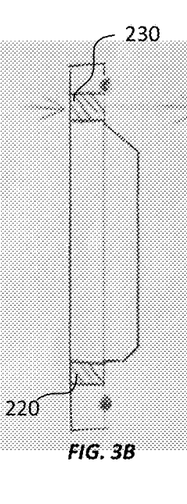
Figure 3C:
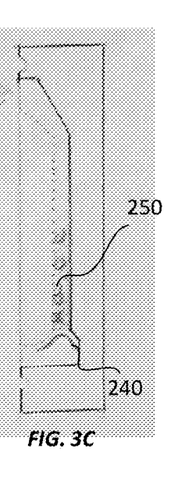

FIGS. 3A-3C show an illustration of filling a housing with microspheres, a corresponding cross-sectional view of a front face of the housing, and a corresponding cross-sectional view of the housing at a 90° angle, respectively, according to some embodiments. In some embodiments, the microspheres 250 can be injected into the housing 200 through a top portion 206 of the housing 200. For example, the microspheres 250 can be poured through the top portion 206 of the housing 200 as shown in FIGS. 3A and 3C. FIG. 3B shows a flow path of the microspheres 250 through the housing 200. The microspheres 250 may be injected from the top portion 206 of the housing 200 using gravitational force. The microspheres 250 can displace any air or atmosphere in the void volume 210 of the housing 200. FIG. 3C shows the microspheres 250 accumulating on the blind 240. The blind 240 prevents the microspheres 250 from leaving the housing 200. The microspheres can accumulate on the blind 240 to allow the microspheres to pack into the tightest conformation in the void volume 210 of the housing 200. The blind 240 also prevents the microspheres from flowing out of the housing 200.

Figure 4A:
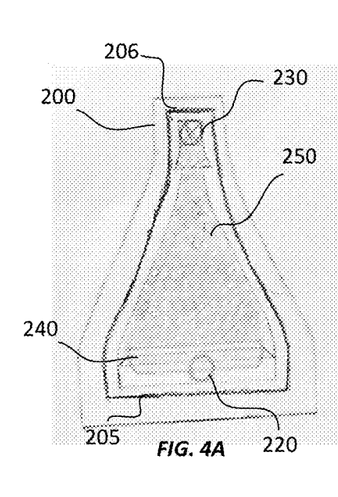
FIGS. 4A-C show an illustration of a housing filled with microspheres, a corresponding cross-sectional view of a front face of the housing, and a corresponding cross-sectional view of the housing at a 90° angle, respectively, according to some embodiments.
Figure 4B:
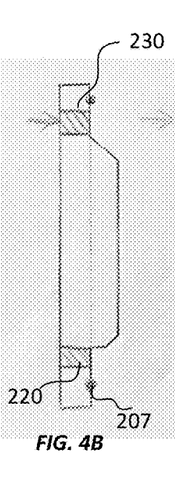
Figures 4C, 5A, 5B:
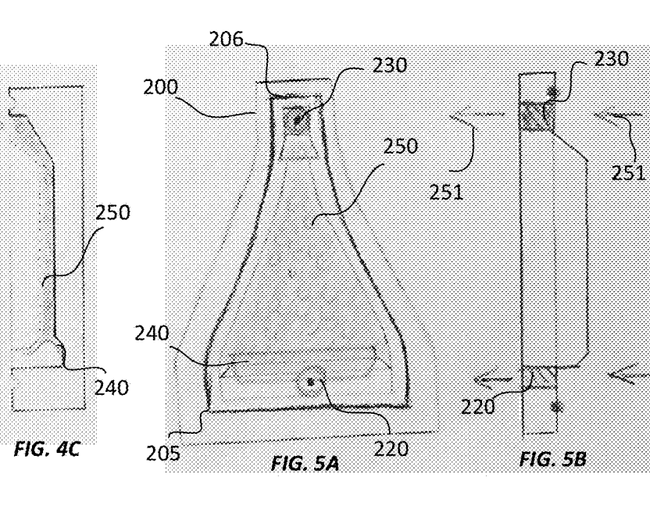
FIGS. 5A-C show an illustration of evacuating atmosphere from the housing filled with microspheres, a corresponding cross-sectional view of a front face of the housing, and a corresponding cross-sectional view of the housing at a 90° angle, respectively, according to some embodiments.

FIGS. 4A-4C show an illustration of a housing filled with microspheres, a corresponding cross-sectional view of a front face of the housing, and a corresponding cross-sectional view of the housing at a 90° angle, respectively, according to some embodiments. The void volume 210 of the housing 200 can be filled with microspheres 250. For example, the microspheres 250 can pack into the void volume 210 of the housing 200 from the base portion 205 to the top portion 206 of the housing 200. The microspheres can accumulate on the blind 240. The blind 240 can be a semi-porous material that allows air and liquids to pass through but not the microspheres 250.

The housing 200 can be agitated while filling the housing 200 with microspheres 250 or after the housing 200 has been filled with microspheres 250. By agitating the housing 200 (e.g., by applying kinetic energy), the microspheres 250 can be manipulated into their most dense packing state. Specifically, the agitating force may overcome the coefficient of friction between the microspheres 250 and allow gravity/entropy/kinetics to position the microspheres 250 in their most stable conformation. This process can position the microspheres 250 in their closest packing state to maximize the amount of microspheres 250 in the final molded article. For example, a vibrational force can be applied to the housing 200 to pack the microspheres 250 within the void volume 210 of the housing 200. The vibrational force can be applied to the housing 200 when the void volume 210 is filled with microspheres 250 to remove any air and pack the microspheres 250 into their tightest conformation. In some embodiments, the housing is agitated by applying one or more of a vibrational force, sonication, or air pressure. Additional microspheres can be added to the void volume 210 if agitating the microspheres 250 creates more space in the void volume 210. In some embodiments, the vibrational force is applied during the entire duration of filling the housing 200 with microspheres 250. For example, the housing 200 can be continuously vibrated while the microspheres 250 are added to the housing 200. The vibrational force can be applied for a period of time (e.g., 10 minutes) after the housing 200 is filled to ensure the highest packing density.

Figure 5C:
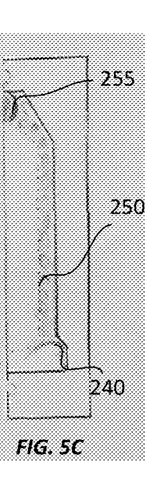

FIGS. 5A-5C show an illustration of evacuating atmosphere from the housing filled with microspheres, a corresponding cross-sectional view of a front face of the housing, and a corresponding cross-sectional view of the housing at a 90° angle, respectively, according to some embodiments. FIGS. 5B and 5C show a vacuum 251 applied to the housing 200 to remove any air or gas from the void volume 210 of the housing 200. The air or gases in the housing 200 can be evacuated from the housing 200 to provide higher packing densities for the microspheres 250 in the void volume 210. For example, air (e.g., atmosphere) that may trapped in the interstitial space between the microspheres 250 can be evacuated from the housing 200. In some embodiments, the housing 200 includes a second blind 255 adjacent the top portion 206 of the housing 200 to prevent any microspheres 250 from exiting the housing 200 when vacuum 251 is applied. The housing 200 can then be sealed by applying pressure to press fit portions of the housing together under pressure. The housing 200 can be sealed while simultaneously applying vacuum 251 to the void volume 210.

Figure 6A:
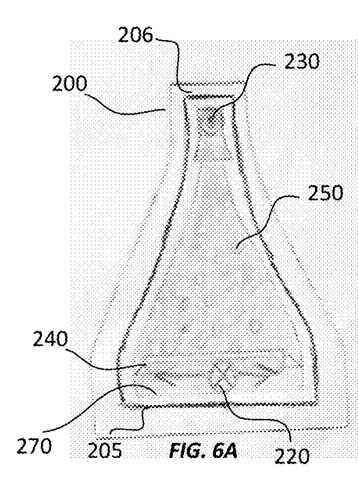
FIGS. 6A-C show an illustration of a resin flowing through an inlet of a housing, a corresponding cross-sectional view of a front face of the housing, and a corresponding cross-sectional view of the housing at a 90° angle, respectively, according to some embodiments.
Figures 6B, 6C:
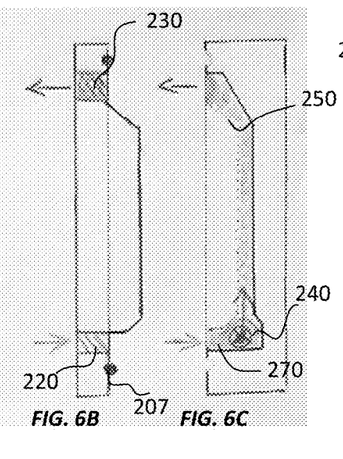

FIGS. 6A-C show an illustration of a resin flowing through an inlet of a housing, a corresponding cross-sectional view of a front face of the housing, and a corresponding cross-sectional view of the housing at a 90° angle, respectively, according to some embodiments. As discussed above, the housing 200 includes a blind 240 at base portion 205 of the housing. The blind 240 can be a screen or porous material that allows resin 270 to flow through the blind and prevents any or most of the microspheres 250 from flowing through the blind 240. As shown in FIGS. 6B and 6C, the resin flow path may begin at a base portion 205 of the housing 200 and flow upward to a top portion 206 of the housing 200 and through the outlet 230. FIG. 6A shows resin 270 entering the base portion 205 of the housing 200 and flowing laterally to provide a uniform flow front through the microspheres 250. In some embodiments, the resin is not provided as a slurry. In some embodiments, the inlet 220 is slowly opened to allow the resin 270 (e.g., low-viscosity resin) to be characterized by a uniform flow from when contacting the microspheres 250.

Figure 7A:
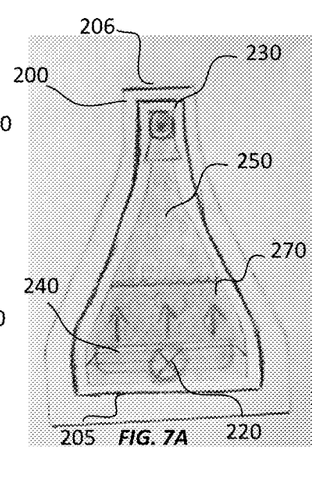
FIGS. 7A-C show an illustration of a resin front flowing through a housing filled with microspheres, a corresponding cross-sectional view of a front face of the housing, and a corresponding cross-sectional view of the housing at a 90° angle, respectively, according to some embodiments.
Figure 7B:
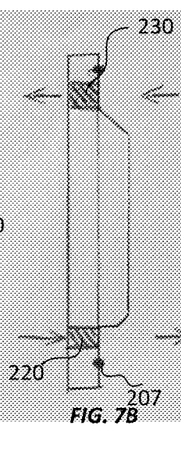
Figure 7C:
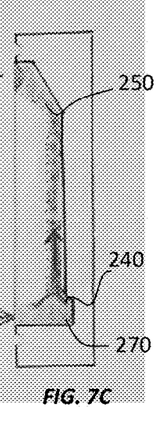

FIGS. 7A-C show an illustration of a resin front flowing through a housing filled with microspheres, a corresponding cross-sectional view of a front face of the housing, and a corresponding cross-sectional view of the housing at a 90° angle, respectively, according to some embodiments. The resin 270 enters the void volume 210 and flows laterally before flowing upwards through the microspheres 250 to form a resin-microsphere matrix. By flowing the resin from the base portion 205 of the housing 200 to the top portion 206 of the housing 200, the resin can be characterized by a uniform flow front through the microspheres 250. The uniform flow front can remove or push air or other gases out of the housing 200 to provide an even resin distribution throughout the volume occupied by the microspheres 250. In some embodiments, active vacuum is applied to the outlet 230 to continuously evacuate any air or gas while the resin 270 flows through the void volume 210.

Figure 8A:
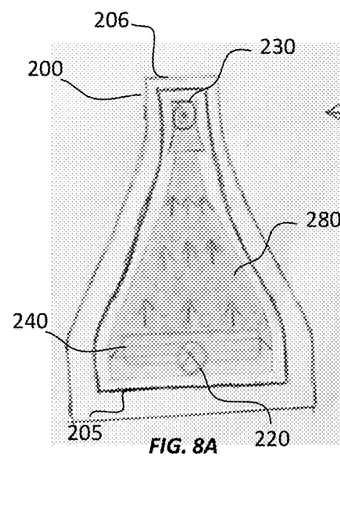
FIGS. 8A-C show an illustration of the resin filling the void volume of the housing, a corresponding cross-sectional view of a front face of the housing, and a corresponding cross-sectional view of the housing at a 90° angle, respectively, according to some embodiments.
Figures 8B, 8C:
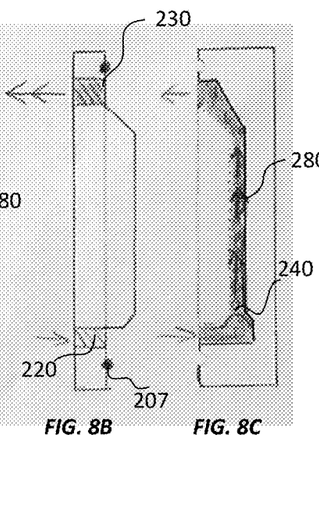

FIGS. 8A-C show an illustration of the resin filling the void volume of the housing, a corresponding cross-sectional view of a front face of the housing, and a corresponding cross-sectional view of the housing at a 90° angle, respectively, according to some embodiments. The resin 270 can completely fill the void volume 210 from the base portion 205 to the top portion 206 of the housing 200 to form a resin-microsphere matrix 280. When the void volume 210 of the housing 200 is filled with resin 270, a portion of the resin 270 may flow through the outlet 230 of the housing 200. The resin 270 flowing through the outlet 230 of the housing 200 can serve as visual confirmation that the void volume is full.

Figures 9A, 9B:
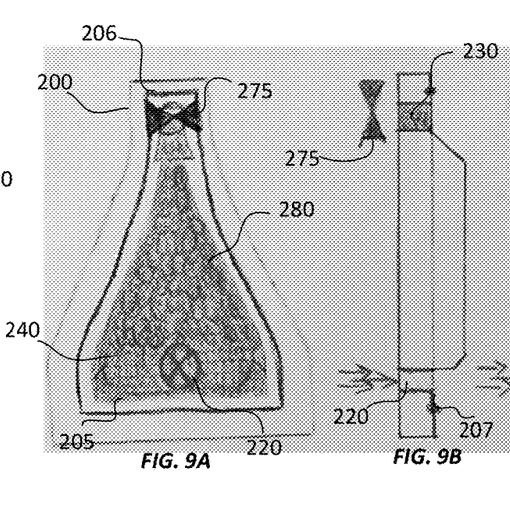
FIGS. 9A-C show an illustration of a housing with a closed outlet valve, a corresponding cross-sectional view of a front face of the housing, and a corresponding cross-sectional view of the housing at a 90° angle, respectively, according to some embodiments.
Figure 9C:
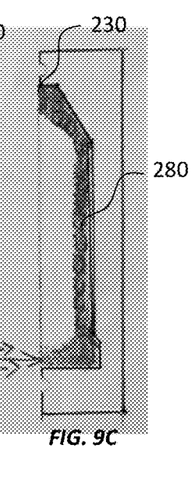

FIGS. 9A-C show an illustration of a housing with a closed outlet valve, a corresponding cross-sectional view of a front face of the housing, and a corresponding cross-sectional view of the housing at a 90° angle, respectively, according to some embodiments. After the resin 270 flows out of the outlet 230, FIGS. 9A and 9B show that a valve 275 at the outlet 230 can be closed to prevent any resin 270 from leaving the void volume 210. As shown in FIGS. 9B and 9C, the resin 270 can continue to flow through the inlet 220 even after valve 275 at the outlet 230 is closed. The resin 270 flowing through the inlet 220 can further pack in the resin 270 in any interstitial space in the void volume 210. By closing the outlet 230 and continuing to flow resin 270 through the inlet 220, the resin 270 creates a back pressure to fill in any interstitial space.

Figures 10A, 10B:
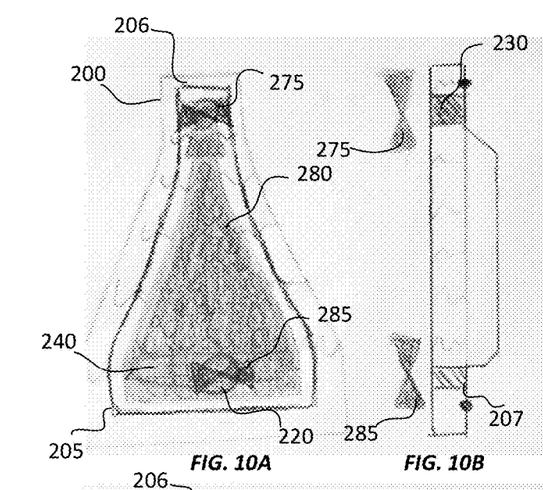
FIGS. 10A-C show an illustration of a housing with a closed inlet and outlet valve, a corresponding cross-sectional view of a front face of the housing, and a corresponding cross-sectional view of the housing at a 90° angle, respectively, according to some embodiments.
Figure 10C:
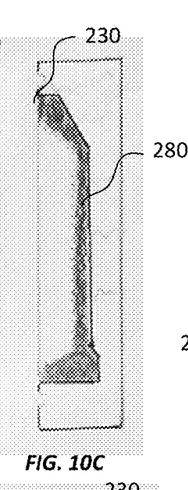

FIGS. 10A-C show an illustration of a housing with a closed inlet and outlet valve, a corresponding cross-sectional view of a front face of the housing, and a corresponding cross-sectional view of the housing at a 90° angle, respectively, according to some embodiments. FIGS. 10A-10C shows that the inlet 220 and the outlet 230 are both closed when the resin 270 fills the void volume. For example, after a back pressure prevents additional resin 270 from flowing into the housing 200, the valve 285 controlling the inlet 220 flow can be closed.

Figure 11A:
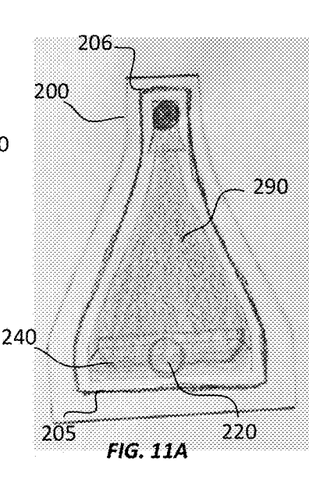
FIGS. 11A-C show an illustration of a cured resin composition in the housing, a corresponding cross-sectional view of a front face of the housing, and a corresponding cross-sectional view of the housing at a 90° angle, respectively, according to some embodiments.
Figures 11B, 11C:
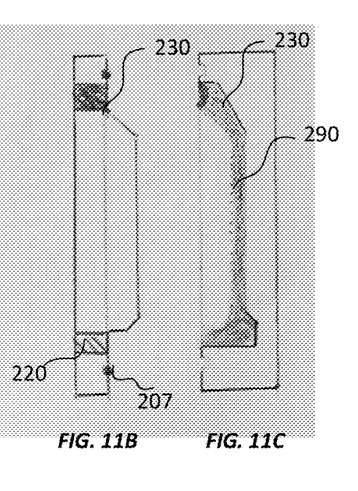

FIGS. 11A-C show an illustration of curing a resin-microsphere matrix in the housing, a corresponding cross-sectional view of a front face of the housing, and a corresponding cross-sectional view of the housing at a 90° angle, respectively, according to some embodiments. The resin-microsphere matrix 280 in the housing 200 can be cured to produce a cured composition 290 (e.g., a molded article). For example, after the plurality of microspheres and the resin are injected into the housing, heat may be applied to the housing to cure the resin in the housing. The resin may be heated in a temperature range from 50° C. to 250° C. for a time sufficient to cure the resin.

Figures 12A, 12B, 12C:
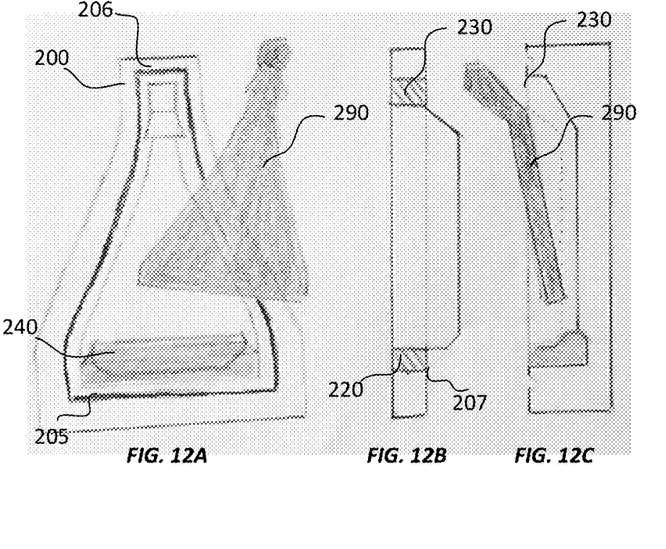
FIGS. 12A-C show an illustration of extracting a cured composition from the housing, a corresponding cross-sectional view of a front face of the housing, and a corresponding cross-sectional view of the housing at a 90° angle, respectively, according to some embodiments.

FIGS. 12A-C show an illustration of extracting a cured composition from the housing, a corresponding cross-sectional view of a front face of the housing, and a corresponding cross-sectional view of the housing at a 90° angle, respectively, according to some embodiments. FIGS. 12A-12C show the cured composition 290 being extracted from the housing 200.

Figure 13:
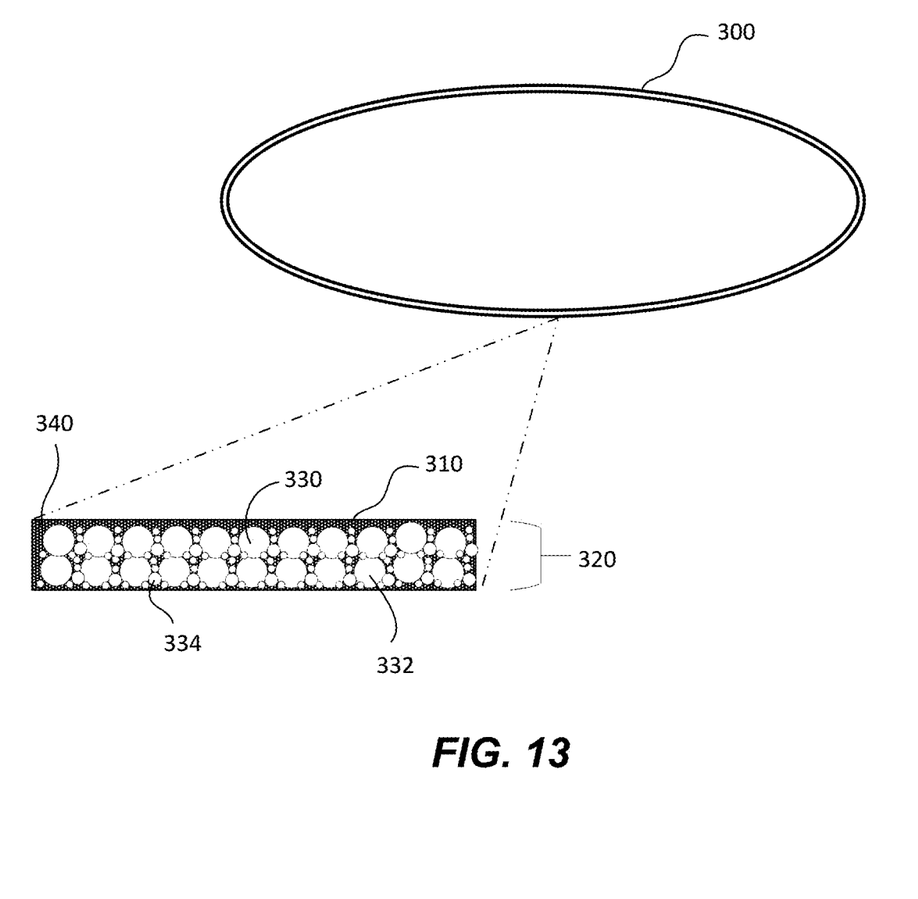
FIG. 13 is a simplified schematic diagram illustrating a syntactic foam according to some embodiments of the present invention.

FIG. 13 is a simplified schematic diagram illustrating a molded article comprised of a syntactic foam according to an embodiment of the present invention. In some embodiments, a molded article 300 may comprise a syntactic foam 310. The syntactic foam 310 may be molded into an any suitable shape to produce the molded article 300. As described herein, the syntactic foam 310 can be produced in a housing (e.g., a mold) having a cavity to form the molded article 300. For example, the syntactic foam 310 can be molded into a hull for an underwater vehicle. In some embodiments, the syntactic foam 310 can be molded into a casing for housing components within the hull of an underwater vehicle. In some embodiments, the syntactic foam 310 can be molded into shapes that fit into the void volume of the hull of an underwater vehicle to provide buoyancy.

The syntactic foam 310 may include a resin-microsphere matrix 320. The resin-microsphere matrix 320 includes a plurality of microspheres 330 within a dried resin 340. For example, the plurality of a microspheres 330 can be embedded in the dried resin 340 to form the resin-microsphere matrix 320. The resin-microsphere matrix 320 may include a plurality of microspheres 330 having different sizes. For example, FIG. 13 shows a first set of microspheres 332 having a larger average diameter than a second set of microspheres 334. In some embodiments, the first set of microspheres 332 may have an average diameter from 100 to 150 microns and the second set of microspheres 334 may have an average diameter from 50 to 100 microns. The second set of microspheres 334 may fill the interstitial space between the first set of microspheres 332. In some embodiments, the plurality of a microspheres 330 can be hollow glass microspheres.

The dried resin 340 fills the interstitial space between the plurality of microspheres 330. For example, the dried resin 340 can fill any of the remaining interstitial space between the first set of microspheres 332 and the second set of microspheres 334. The dried resin 340 can be cured to embed the plurality of microspheres 330 within the dried resin 340 to form the resin-microsphere matrix 320. In some embodiments, the dried resin 340 (e.g., after curing) may have a density of ranging from 0.99 g/cm$^3$ to 1.05 g/cm$^3$. In some embodiments, the dried resin 340 comprises a dicyclopentadiene-based resin and a metallic catalyst. The high packed density of the resin-microsphere matrix 320 provides a syntactic foam 310 that is both buoyant and can withstand high compressive forces.

The aforementioned methods and systems produce a syntactic foam including a plurality of microspheres comprising glass in a resin matrix. The syntactic foam be used to form the outer shell of an underwater vehicle. In particular, the disclosure describes a number of embodiments related to producing syntactic foams that provide buoyancy in high-pressure environments. The syntactic foams described herein may be used as an external shell for an underwater vehicle or can be provided in an interior volume of an underwater vehicle to provide a requisite amount of buoyancy. For example, the syntactic foam can be used as an external shell (e.g., hull) of an underwater vehicle. In some embodiments, the syntactic foams described herein substantially maintains its buoyancy in high-pressure environments even at high compressive forces. Although some of the embodiments discussed herein are related to methods and system for producing syntactic foams for deep-water applications, it is to be understood that the approaches described here may be employed in any suitable application where high pressures are involved.

Although the disclosure focuses on embodiments having particular combinations and numbers of elements for methods and systems of producing a syntactic foam, these are to be considered only as example embodiments. That is, the disclosure contemplates embodiments with any suitable combination or number of the disclosed elements.

The foregoing description, for purposes of explanation, used specific nomenclature to provide a thorough understanding of the described embodiments. However, it will be apparent to one skilled in the art that the specific details are not required in order to practice the described embodiments. Thus, the foregoing descriptions of specific embodiments are presented for purposes of illustration and description. They are not intended to be exhaustive or to limit the described embodiments to the precise forms disclosed. It will be apparent to one of ordinary skill in the art that many modifications and variations are possible in view of the above teachings.

What is claimed is:

1. A method of producing a syntactic foam, the method comprising:
   providing a housing comprising a void volume, wherein the housing includes an inlet and an outlet to the void volume;
   injecting a plurality of microspheres comprising glass into the void volume of the housing, wherein the plurality of microspheres comprise a first set of microspheres having an average diameter ranging from 5 microns to 150 microns;
   agitating the housing to settle the plurality of microspheres within the housing; and
   injecting a resin from the inlet of the housing to the outlet of the housing to fill voids between the plurality of microspheres to produce a resin-microsphere matrix, wherein the resin comprises a viscosity less than 100 centipoise.

2. The method of claim 1, wherein the plurality of microspheres further comprises a second set of microspheres having an average diameter different from the first set of microspheres.

3. The method of claim 1, wherein injecting the plurality of microspheres comprises progressively injecting a plurality of sets of microspheres into a top portion of the housing.

4. The method of claim 3, wherein agitating the housing comprises sequentially agitating the housing each time a set of microspheres of the plurality of sets of microspheres is injected into the housing.

5. The method of claim 3, wherein the resin is injected after each set of the plurality of sets of microspheres are injected into the housing.

6. The method of claim 1, wherein agitating the housing comprises applying a vibrational force, sonication, or air pressure.

7. The method of claim 1, wherein the plurality of microspheres are hollow.

8. The method of claim 1, wherein the resin is characterized by a viscosity less than 50 centipoise, and wherein the resin comprises a dicyclopentadiene-based resin.

9. The method of claim 1, further comprising applying a gas flow through the housing to settle the plurality of microspheres in the housing.

10. The method of claim 9, wherein the gas flow is applied concurrently with agitating the housing, and wherein the gas flow is along a direction parallel to a gravitational force.

11. The method of claim 1, wherein the resin has a density ranging from 0.95 g/cm$^3$ to 1.00 g/cm$^3$.

12. The method of claim 1, wherein the average diameter ranges from 10 microns to 40 microns.

13. The method of claim 1, wherein the resin is not a slurry.

14. The method of claim 1, further comprising curing the resin-microsphere matrix in the housing to produce a cured composition, wherein a density of the resin after curing ranges from 0.99 g/cm$^3$ to 1.05 g/cm$^3$.

15. The method of claim 14, further comprising crushing the cured composition in the housing.

* * * * *